United States Patent [19]

Gschneidner, Jr. et al.

[11] Patent Number: 5,462,610
[45] Date of Patent: Oct. 31, 1995

[54] LANTHANIDE AL-NI BASE ERICSSON CYCLE MAGNETIC REFRIGERANTS

[75] Inventors: Karl A. Gschneidner, Jr., Ames, Iowa; Hiroyuki Takeya, Ibaraki, Japan

[73] Assignee: Iowa State University Research Foundation, Inc., Ames, Iowa

[21] Appl. No.: 88,881

[22] Filed: Jul. 8, 1993

[51] Int. Cl.$^6$ .................................. C22C 28/00
[52] U.S. Cl. ........................................ 148/301; 420/416
[58] Field of Search ........................ 148/301; 420/416

[56] References Cited

U.S. PATENT DOCUMENTS

| | | | |
|---|---|---|---|
| 4,849,017 | 7/1989 | Sahashi et al. | 148/301 |
| 5,213,630 | 5/1993 | Hashimoto | 148/301 |

FOREIGN PATENT DOCUMENTS

| | | |
|---|---|---|
| 193743 | 9/1986 | European Pat. Off. |
| 62-030829 | 2/1987 | Japan. |
| 62-030840 | 2/1987 | Japan. |

OTHER PUBLICATIONS

Structural and Magnetic Studies on Rare–Earth Compounds RNiAl and RCuAL; Journal of Less Common Metals, 30 (1973) 225–236; Hans Oesterreicher.
Journal of Less Common Metals 30, 1973 pp. 226–235.
"Materials for Regenerative Magnetic Cooling Spanning 20K to 80K"; Adv. Cryogenic Eng. 37, 1992, pp. 883–890; Zimm, Ludeman, Severson, Henning.
"Heat Capacity in Superconducting and Normal–State LaS$_x$ (1.333≦x≦1.500) Compounds", Phys. Review B, vol. 25, No. 7, Apr. 1, 1982, pp. 4604–4617; Ikeda, Gschneidner, Jr., Beaudry, Atzmony.
"Comptes Rendus Herbdomadaires Des Séances" De L'académie Des Sciences, 247, pp. 1836–1838 (1958).
"Thermodynamic Analysis of Magnetically Active Regenerator From 30 to 70K with a Brayton–like Cycle"; Cryogenics, 1990, vol. 30, Oct., pp. 840–845; Matsumoto, Hashimoto.
"An Ericsson Magnetic Refrigerator For Low Temperature"; Adv. in Cryo. Eng., vol. 33, pp. 743–450; Matsumoto, Ito, Hashimoto 1988.
"Binary Alloy Phase Diagrams", 2nd Edition, vol. 1, (1990), pp. 144–145.
"Investigation of the Magnetic Refrigerant for the Ericsson Magnetic Refrigerator"; Jap. J. App. Phys., vol. 26 (1987), pp. 1673–1674; Hashimoto, et al.
"New Application of Complex Magnetic Materials to the Magnetic Refrigerant in an Ericsson Magnetic Refrigerator"; J. Appl. Phys. 62(9), Nov. 1, 1987, pp. 3873–3878; Hashimoto, et al.

Primary Examiner—David A. Simmons
Assistant Examiner—Margery S. Phipps
Attorney, Agent, or Firm—Edward J. Timmer

[57] ABSTRACT

A magnetic refrigerant for a magnetic refrigerator using the Ericsson thermodynamic cycle comprises DyAlNi and $(Gd_{0.54} Er_{0.46})AlNi$ alloys having a relatively constant $\Delta Tmc$ over a wide temperature range.

13 Claims, 14 Drawing Sheets

THE CALCULATED MAGNETOCALORIC EFFECT FOR FOUR DIFFERENT MAGNETIC FIELD CHANGES AS A FUNCTION OF TEMPERATURE FOR DyAlNi - SAMPLE B.

HEAT CAPACITY OF DyAlNi - SAMPLE B FROM ~2 TO 70 K AT 5 DIFFERENT FIELDS.

FIG. 4

ENTROPY OF DyAlNi - SAMPLE B FROM 0 TO 70K AT FIVE DIFFERENT FIELDS.

FIG. 5

THE CALCULATED MAGNETOCALORIC EFFECT FOR FOUR DIFFERENT MAGNETIC FIELD CHANGES AS A FUNCTION OF TEMPERATURE FOR DyAlNi - SAMPLE B.

FIG. 6

HEAT CAPACITY OF $(Gd_{0.54}Er_{0.46})AlNi$ FROM ~2 TO 60 K AT FIVE DIFFERENT FIELDS.

FIG. 7

THE C/T VS. T PLOT FOR $(Gd_{0.54}Er_{0.46})AlNi$ AS A FUNCTION OF TEMPERATURE FROM ~1.5 TO 80K AT FIVE MAGNETIC FIELDS.

FIG. 8

ENTROPY OF $(Gd_{0.54}Er_{0.46})AlNi$ FROM 0 TO 80 K AT FIVE DIFFERENT FIELDS.

FIG. 9

THE CALCULATED MAGNETOCALORIC EFFECT FOR FOUR DIFFERENT MAGNETIC FIELD CHANGES AS A FUNCTION OF TEMPERATURE FOR $(Gd_{0.54}Er_{0.46})AlNi$.

LANTHANIDE AL-NI BASE ERICSSON CYCLE MAGNETIC REFRIGERANTS

CONTRACTUAL ORIGIN OF INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to magnetic refrigeration and, more particularly, to an active magnetic regenerative refrigeration device using the Ericsson thermodynamic cycle for the liquefaction of hydrogen and/or hydrogen slush (a mixture of solid and liquid hydrogen) and to a magnetic refrigerant comprising ternary and quaternary lanthanide AlNi base intermetallic alloys having a temperature change versus temperature characteristic suited to Ericsson cycle magnetic refrigerators.

BACKGROUND OF THE INVENTION

Magnetic refrigeration is being considered as an alternative technique to gas compressor technology for cooling and heating based on engineering and economic considerations that indicate that magnetic regenerator refrigerators, in principle, using currently known and available magnetic materials are more efficient than gas cycle refrigerators and thus can yield savings in the cost of operation and conservation of energy.

In the use of magnetic regenerator refrigeration of liquefaction of hydrogen gas, the conventional magnetic refrigerant employed to-date comprises a GdPd alloy. This magnetic refrigerant is disadvantageous from a cost standpoint in that 50% of the alloy comprises expensive Pd metal. A second disadvantage is that the GdPd alloy is somewhat ductile and thus is difficult to crush into fine particles (or powder) which are necessary for efficient heat transfer during the refrigeration cycle. Moreover, although the GdPd alloy exhibits useful magnetic entropy, there are several other heavy lanthanides (e.g. Tb, Dy, Ho, and Er) that exhibit magnetic entropy values approximately 35% larger than that of Gd and thus theoretically offer improved properties for magnetic refrigeration, provided all of the magnetic entropy is associated with the ferromagnetic ordering process on which magnetic refrigeration is based. Magnetic materials including Tb, Dy, Ho, and Er appear to have been neglected as candidate magnetic refrigerants as a result of the belief that an appreciable fraction of the magnetic entropy of these materials is associated with crystalline electric field effects, not ferromagnetic ordering, and thus would be less than the magnetic entropy attributed to ferromagnetic ordering observed in Gd in which there are no crystal field effects. Moreover, materials containing Tb, Dy, Ho, and Er exhibit a disadvantageously lower ferromagnetic ordering temperature than the GdPd alloy.

U.S. Pat. No. 4,829,770 describes an attempt to provide a magnetic refrigerant material exhibiting magneto-thermal properties for a magnetic regenerator refrigerator based on the Ericsson thermodynamic cycle. In particular, the patent describes a complex magnetic refrigerant that must include at least three distinct magnetic aluminide compounds in powdered or sintered admixture or in a multi-layered arrangement. The magnetic compounds are selected from aluminides of Gd, Tb, Dy, Ho and Er. The magnetic refrigerant mixture or multi-layer described in the patent is formulated for use specifically in an Ericsson thermodynamic cycle refrigerator and is disadvantageous as a result of its complexity in the number of magnetic compounds involved and in the form of the material as either an admixture or multi-layer.

An object of the present invention is to provide a magnetic refrigerant that exhibits magneto-thermal properties useful for a magnetic regenerator refrigerator using the Ericsson thermodynamic cycle and that can be processed to useful form without the need for complex admixturing or multi-layering with other magnetic compounds or materials.

SUMMARY OF THE INVENTION

The present invention provides a magnetic refrigerant for a magnetic refrigerator using the known Ericsson thermodynamic cycle wherein the refrigerant comprises RAlNi wherein R is selected from one of Gd, Tb, Dy, Ho, and Er.

The present invention also provides an Ericsson magnetic refrigerant comprising $(R_{1-x} R')$AlNi wherein R and R' are different lanthanide elements selected from the group consisting of Gd, Tb, Dy, Ho, and Er and where x is greater than 0 and less than 1.

In one embodiment of the invention, the magnetic refrigerant comprises DyAlNi ternary alloy. In another embodiment of the invention, the magnetic refrigerant comprises a $(Gd_{0.54} Er_{0.46})$AlNi quaternary solid solution alloy.

The refrigerants of the invention exhibit relatively constant temperature change versus temperature characteristic especially suited for Ericsson cycle refrigerators so that a single refrigerant composition of the invention can be used and thereby eliminate the need for the complex three component refrigerants described hereabove.

The present invention also provides an Ericsson cycle magnetic refrigerator and process using a magnetic refrigerant comprising a ternary or quaternary intermetallic composition described hereabove.

The aforementioned objects and advantages of the invention will become more readily apparent from the following detailed description taken with the following drawings.

DETAILED DESCRIPTION

The magnetic refrigerant working element of the invention is useful in a magnetic refrigerator operating on the known Ericsson thermodynamic cycle. The Ericsson cycle involves an isothermal compression and expansion steps at different temperatures bounded by constant pressure regenerative process regardless of whether refrigeration is via gas working medium or magnetic refrigerant working medium. With respect to use of a magnetic refrigerant, refrigeration is effected by cyclic heat dissipation and heat absorption in the course of magnetization and demagnetization of the magnetic refrigerant. The Ericsson thermodynamic cycle is described in U.S. Pat. No. 4 829 770, the teachings of which are incorporated by reference herein. The Ericsson refrigeration cycle for liquefaction of hydrogen typically can be efficiently conducted in the temperature range of about 80 K. to about 5 K.

The magnetic refrigerant of the invention useful in an Ericsson type of magnetic refrigerator comprises an intermetallic compound (alloy) represented generally by the atomic formula RAlNi wherein R is selected from the group consisting of Gd, Tb, Dy, Ho, and Er or atomic formula $(R_{1-x}R')$ AlNi wherein R and R' are different lanthanides selected from the group consisting of Gd, Tb, Dy, Ho, and Er and x is equal to or greater than 0 and less than 1 and x is selected at a particular value (i.e. R/R' ratio) suitable for an Ericsson cycle operable at temperature in the range of about 80 K. to about 5 K.

A preferred Ericsson magnetic refrigerant of the invention comprises a ternary alloy having the atomic formula DyAlNi. Another preferred Ericsson magnetic refrigerant of the invention comprises a quaternary alloy having the atomic formula $(Gd_{0.54} Er_{0.46})AlNi$.

In preparation of the magnetic refrigerants of the invention, the ternary alloy is made by arc-melting a mixture of A and Ni particulates (e.g. chunks of Al and Ni) in proper proportions on a water-cooled copper hearth. The solidified non-lanthanide melt then is arc-melted with chunks of the lanthanide metal in proper proportions on a water-cooled copper hearth. The solidified ternary melt then is annealed at a suitable temperature to assure that the ternary alloy has a single phase microstructure.

The quaternary alloy is made by arc-melting a mixture of Al and Ni particulates (e.g. chunks of Al and Ni) in proper proportions on a water-cooled copper hearth. The lanthanide metals are also arc-melted as a mixture of lanthanide particulates (e.g. chunks of Gd and Er) in proper proportions on a water-cooled copper hearth. The solidified non-lanthanide melt and the solidified lanthanide melt then are arc-melted in proper proportions on a water-cooled copper hearth to form the desired quaternary alloy. The solidified quaternary melt then is annealed at a suitable temperature to assure that the quaternary alloy has a single phase microstructure.

The starting lanthanide metals were 99.8+atomic % pure, and the Al and Ni were greater than 99.99% pure as determined by the commercial supplier.

The ternary and quaternary alloys described hereabove are formed into a suitable shape for magnetic refrigerant working element for use in an Ericsson magnetic regenerator refrigerator. The alloys can be formed to desired shape for a magnetic refrigerant working element by casting. Alternately, the alloys can be cast and ground or crushed, or melt atomized to form powder. The powder can be formed by powder metallurgy techniques to consolidate and shape the powder or the powder itself can be used as a magnetic refrigerant particulates bed. Magnetic refrigerant working elements are shown in the aforementioned U.S. Pat. No. 4,829,770.

The heat treatment for the ternary DyAlNi alloy preferably is conducted at 925° C. for 14 days followed by 1125° C. for 14 days. The ternary alloy can be heat treated at 900° C. for 14 days but these parameters are not preferred due to presence of excessive second phase constituent in the microstructure. The heat treatment for the quaternary $(Gd_{0.54} Er_{0.46})AlNi$ alloy is conducted at 900° C. for 14 days. The magnetic refrigerant of the invention typically is heat treated after it is formed into the desired shape for a magnetic refrigerant working element.

Figure 1:
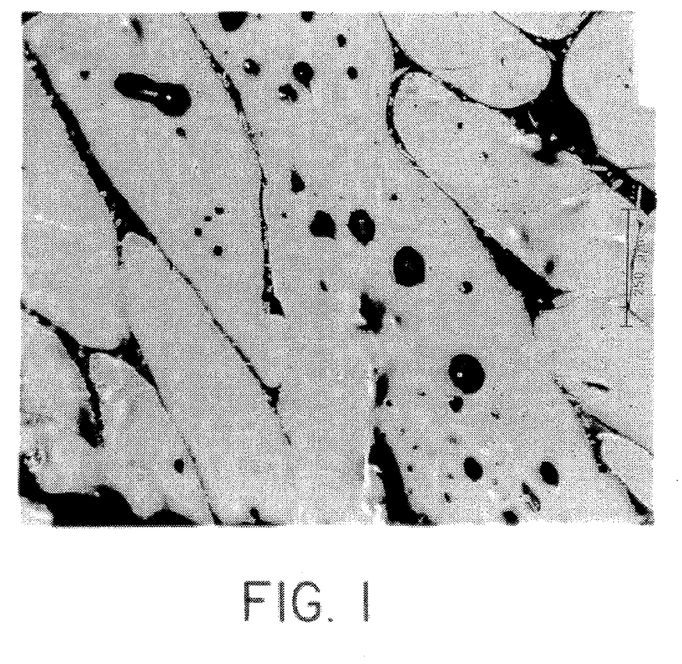
FIG. 1 is a photomicrograph at 80X of the heat treated microstructure of the DyAlNi alloy refrigerant of the invention heat treated at 900° C. for 14 days.
Figure 2:
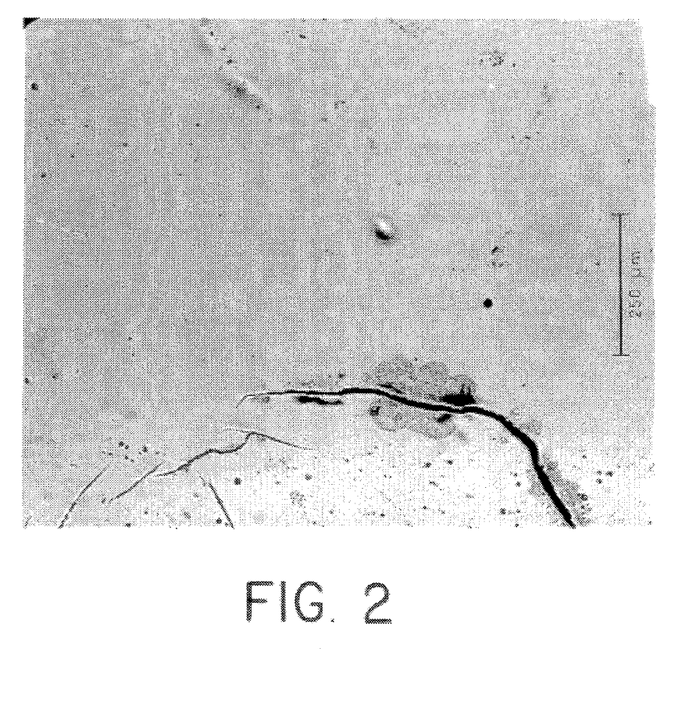
FIG. 2 is a photomicrograph at 100X of the heat treated microstructure of the DyAlNi alloy refrigerant of the invention heat treated at 925° C. for 14 days followed by 1125° C. for 14 days.
Figure 3:
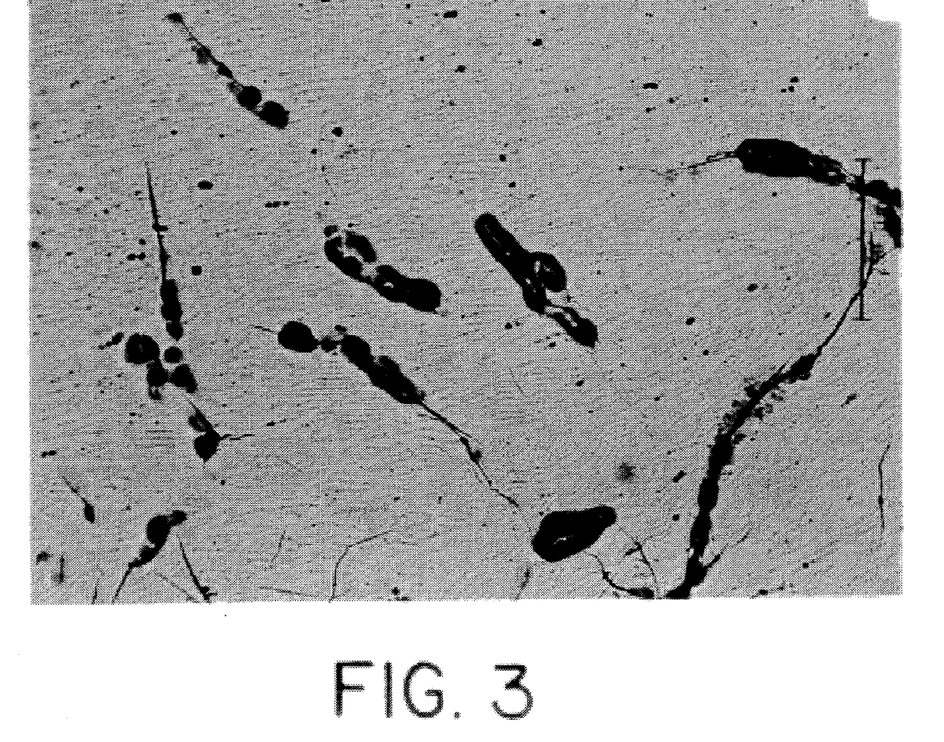
FIG. 3 is a photomicrograph at 80X of the heat treated microstructure of the $(Gd_{0.54} Er_{0.46})$AlNi alloy refrigerant of the invention heat treated at 900° C. for 14 days.

Metallographic examination of the heat treated ternary heat treated at 900° C. for 14 days and also at 925° C. for 14 days followed by 1125° C. for 14 days confirmed a reduction in the volume % of second phase constituent in the microstructure. For example, referring to FIGS. 1 and 2, the ternary alloy heat treated at 900° C. for 14 days exhibited approximately 10 volume % of second phase (FIG. 1), while same alloy heat treated at 925° C. for 14 days followed by 1125° C. for 14 days exhibited less than 1 volume % of the second phase in the microstructure. Thus, the latter duplex heat treatment is preferred. Metallographic examination of the heat treated quaternary $(Gd_{0.54} Er_{0.46})AlNi$ alloy indicated a substantially single phase microstructure having only a few volume % of a second phase as the small round islands shown in FIG. 3.

FIGS. 4–6 and 7–10 illustrate the results of heat capacity tests conducted on respective heat treated DyAlNi and $(Gd_{0.54} Er_{0.46})AlNi$ specimens of the invention. The heat capacity was measured in accordance with the procedures described by the Ikeda et al. article entitled HEAT CAPACITIES IN SUPERCONDUCTING AND NORMAL-STATE $LaS_x(1,333 \leq x \leq 1,500)$ COMPOUNDS, *Physical Review B*, Vol. 25, Number 7, pages 4604–4617, (1982) the teachings of which are incorporated herein by reference.

Figure 4:
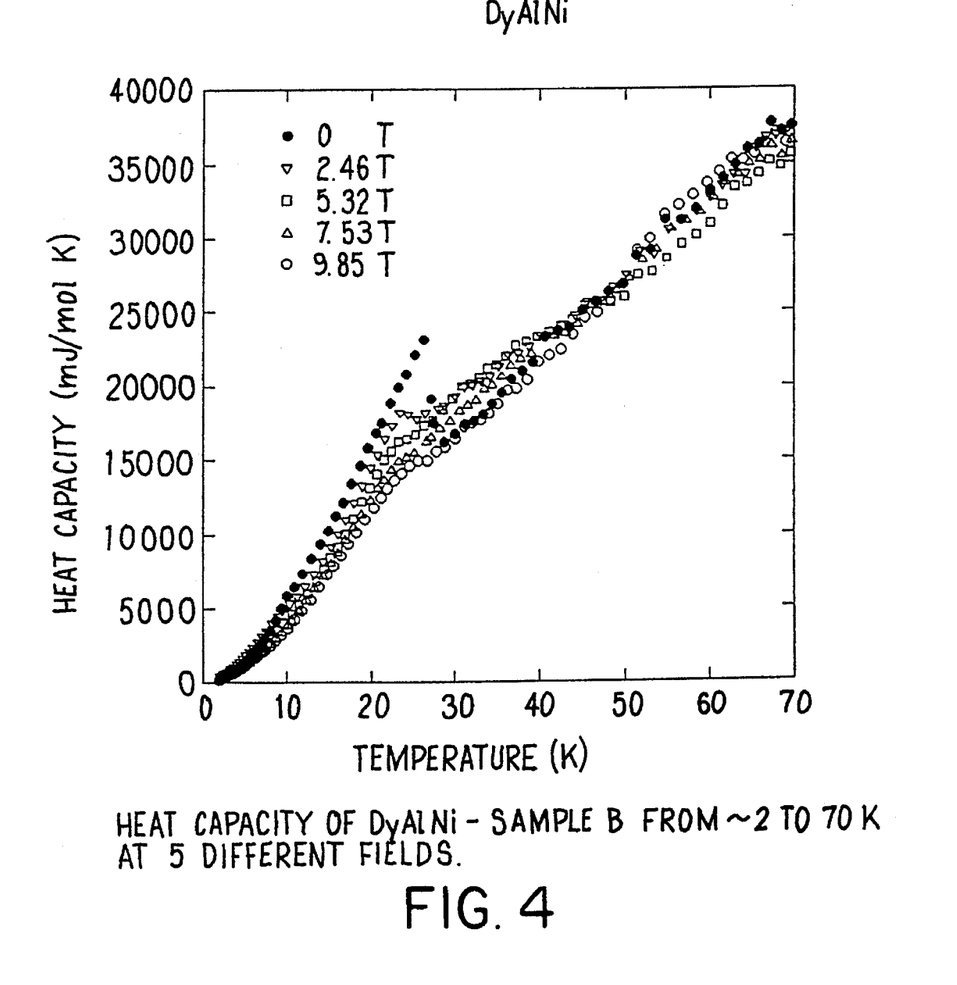
FIG. 4 is a graph of heat capacity versus temperature for the magnetic fields set forth for the DyAlNi alloy of FIG. 2.
Figure 5:
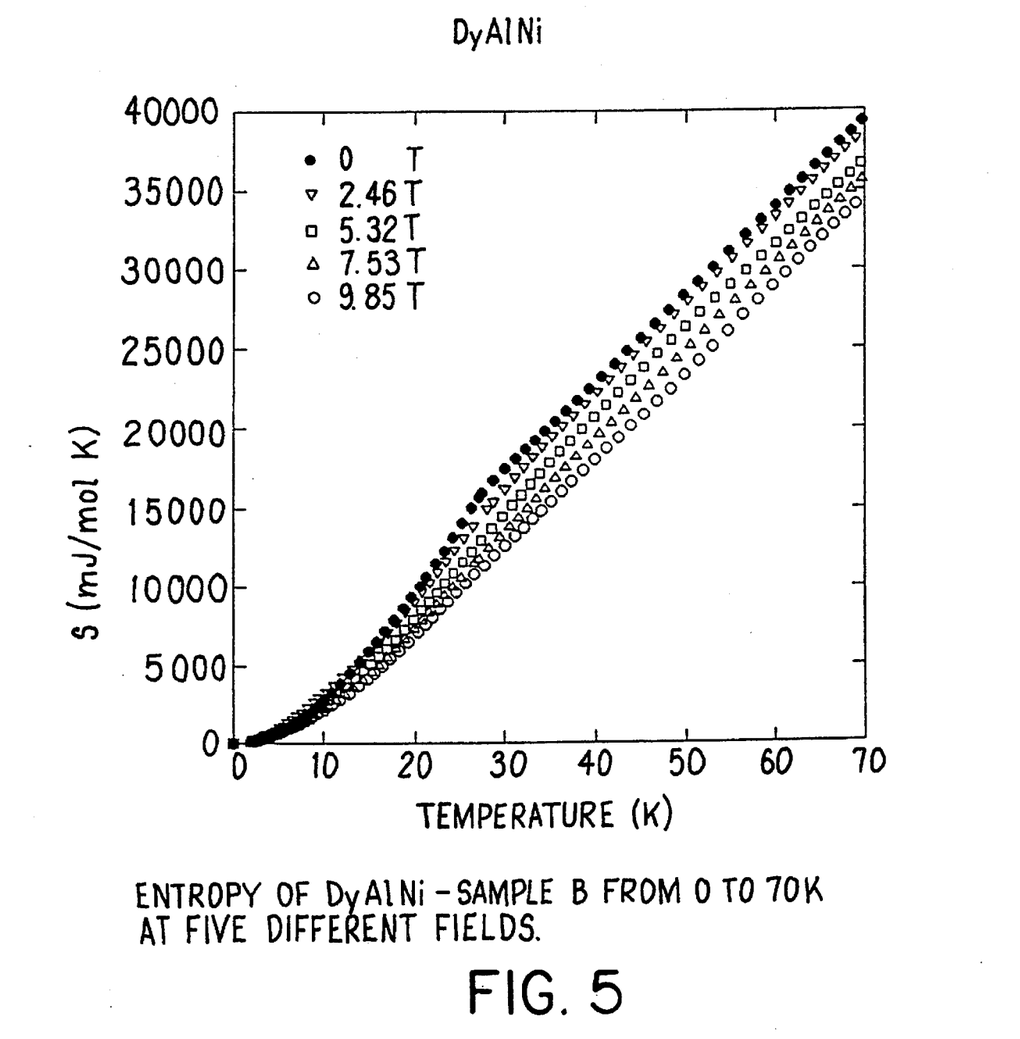
FIG. 5 is a graph of entropy versus temperature for the magnetic fields set forth for the DyAlNi alloy of FIG. 2.
Figure 6:
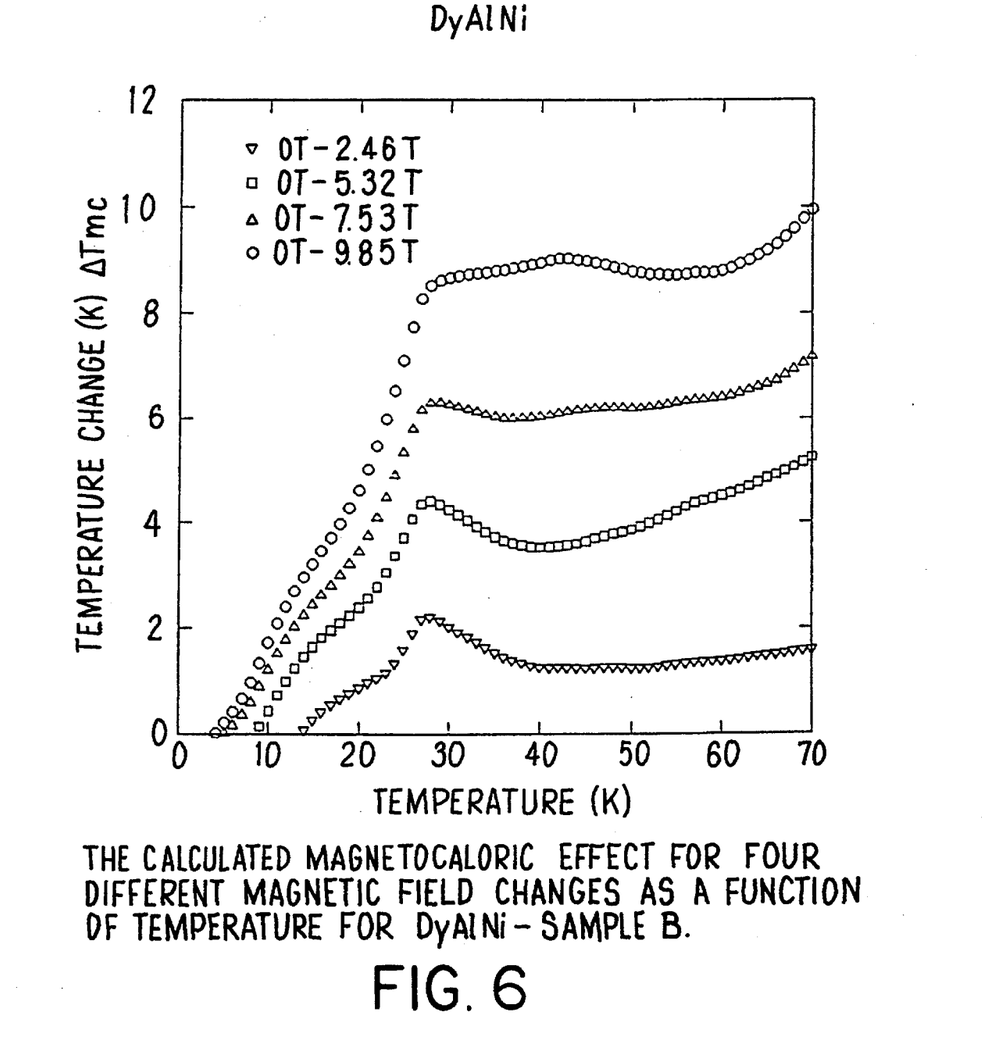
FIG. 6 is a graph of calculated temperature change ΔTmc (magnetocaloric effect) versus temperature for the magnetic field changes set forth for the DyAlNi alloy of FIG. 2.
Figure 7:
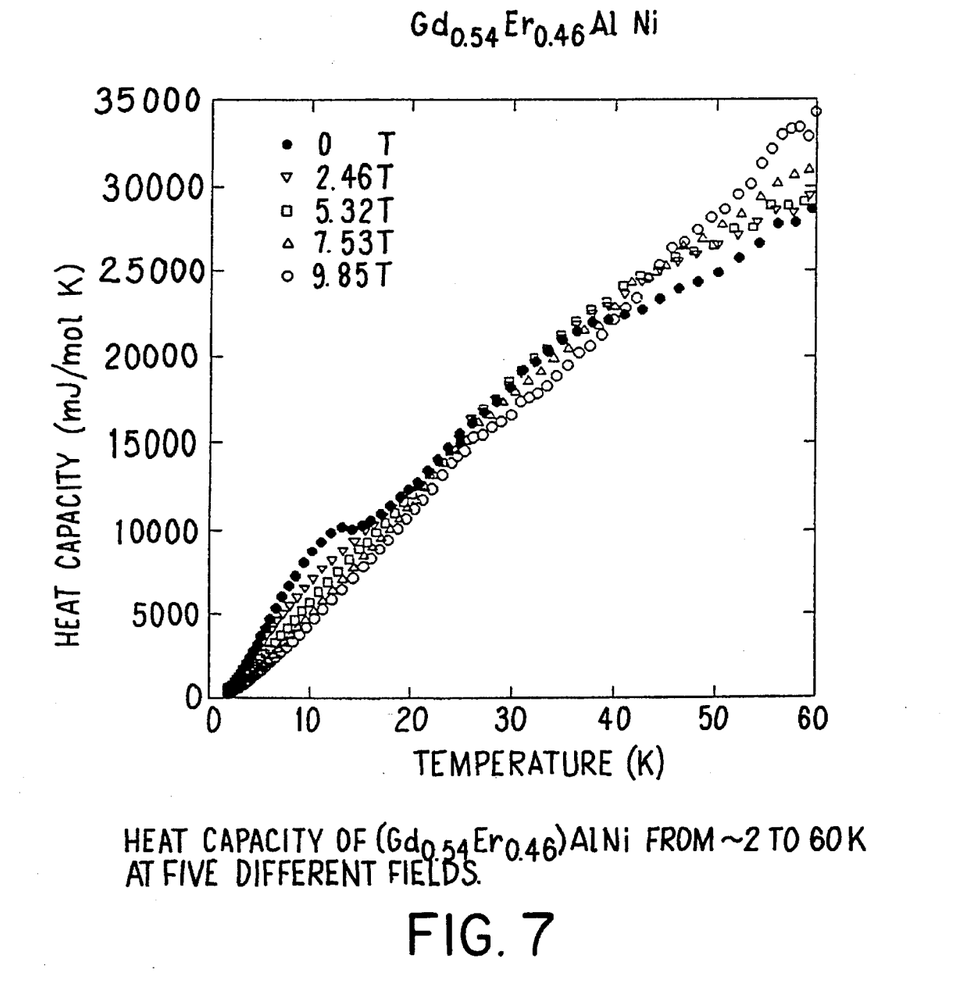
FIG. 7 is a graph of heat capacity versus temperature for the magnetic fields set forth for the $(Gd_{0.54} Er_{0.46})$AlNi alloy.
Figure 8:
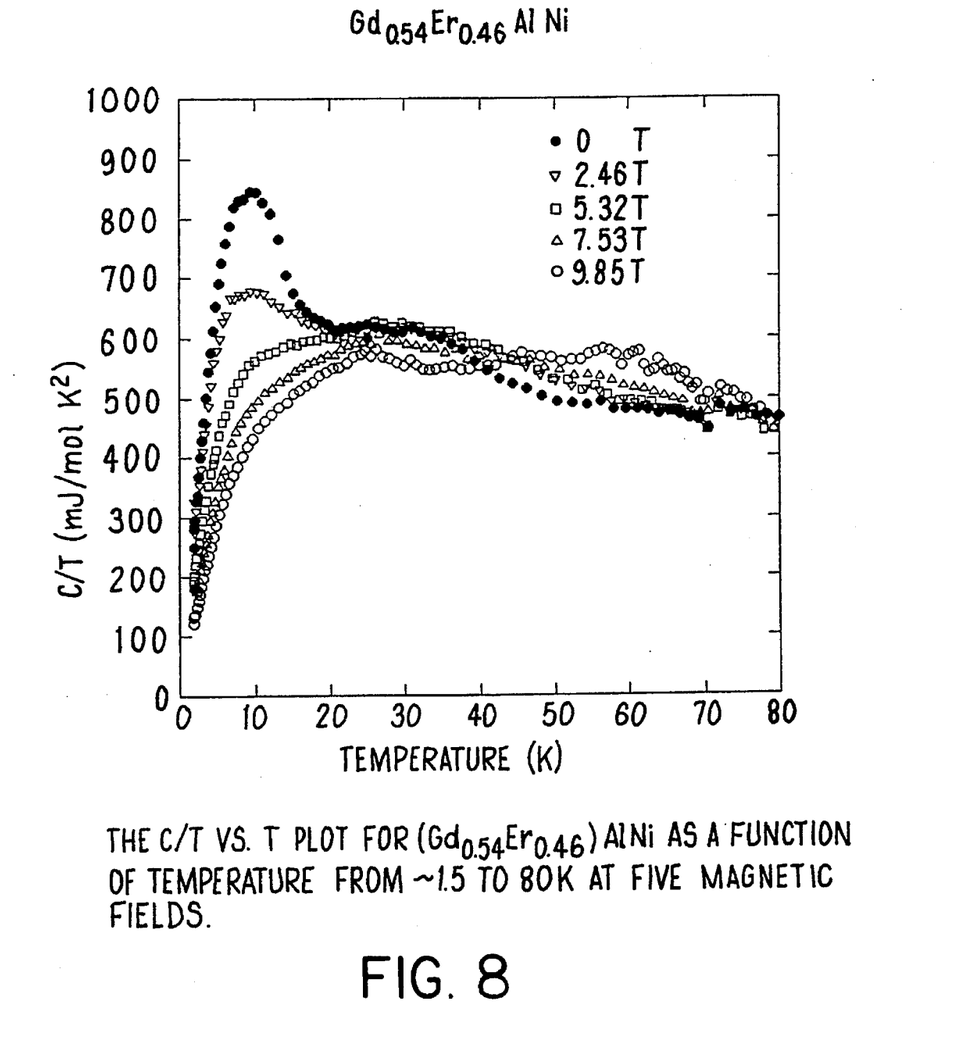
FIG. 8 is a graph of C/T versus temperature for the magnetic fields set forth for the $(Gd_{0.54} Er_{0.46})AlNi$ alloy.
Figure 9:
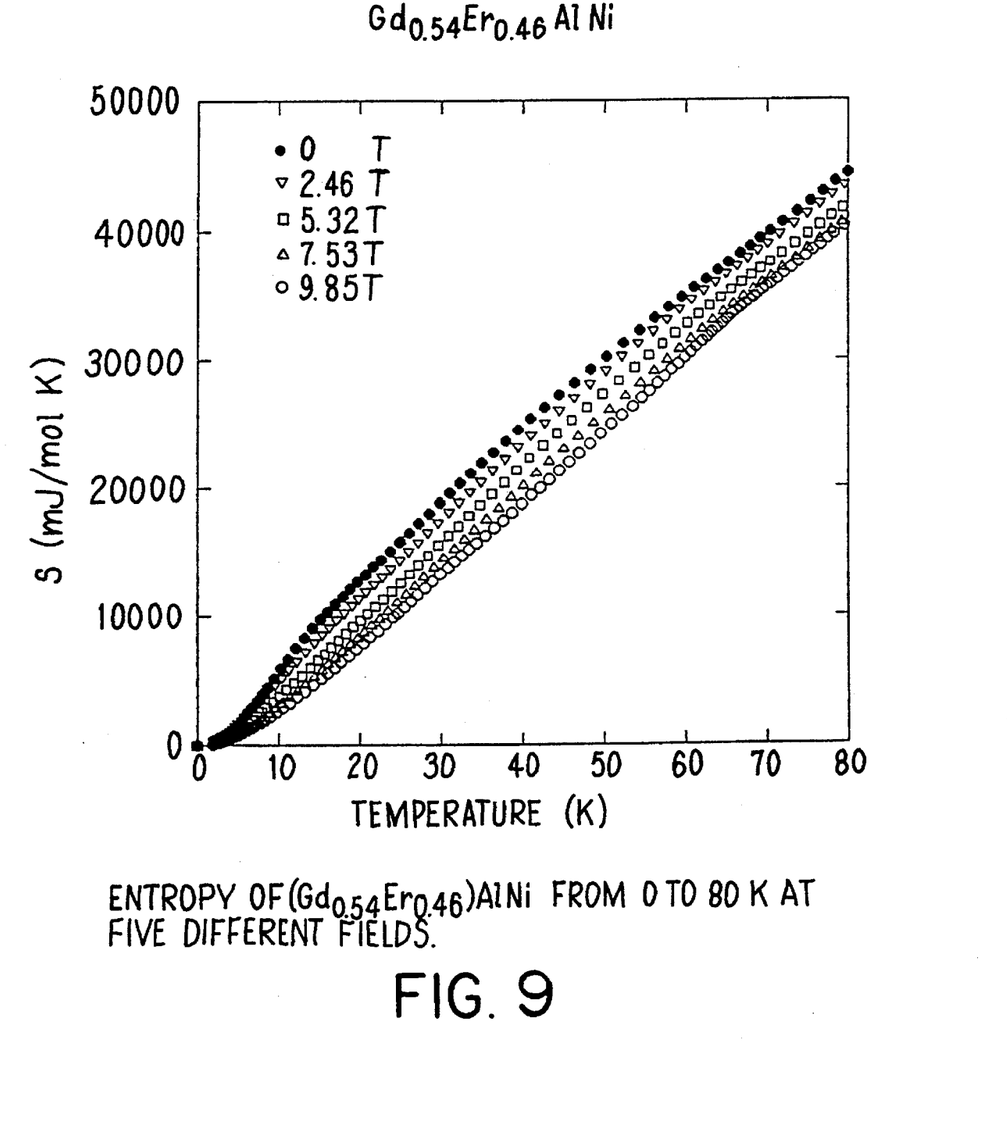
FIG. 9 is a graph of entropy versus temperature for the magnetic fields set forth for the $(Gd_{0.54} Er_{0.46})AlNi$ alloy.
Figure 10:
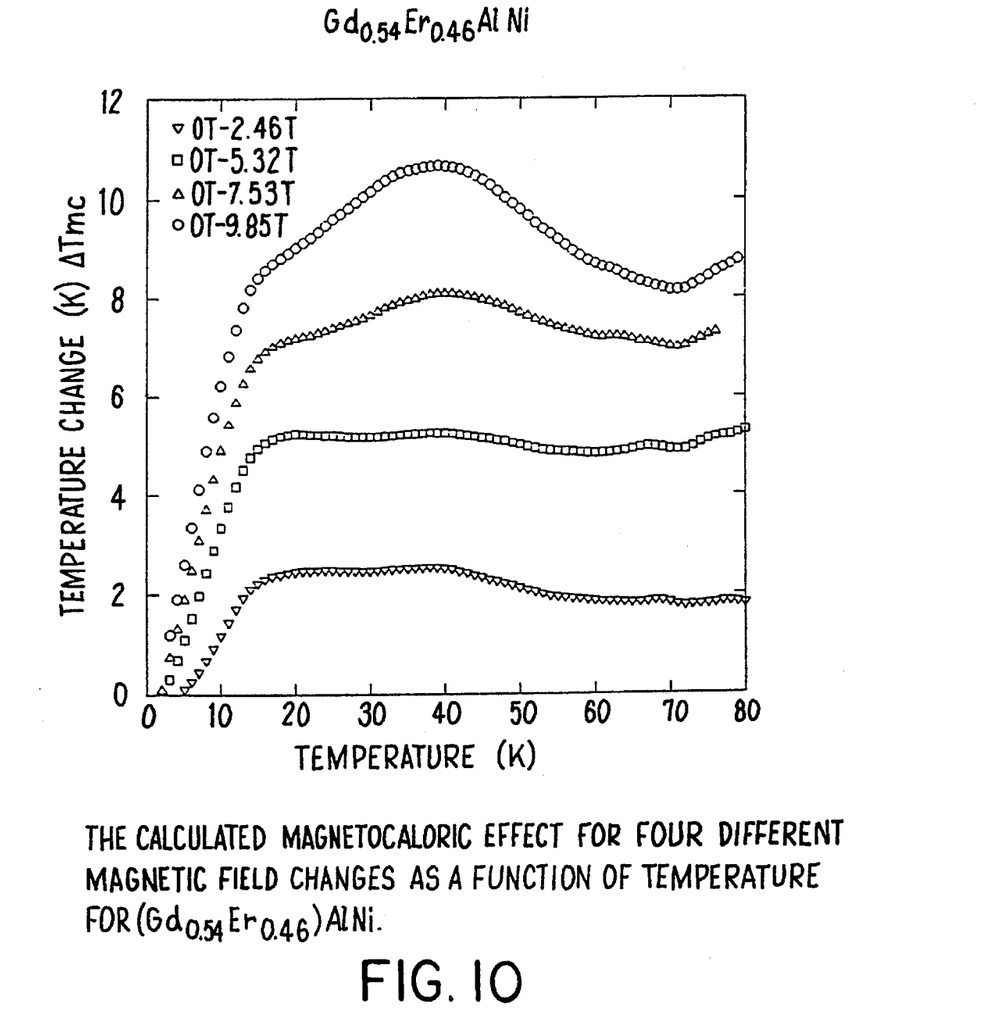
FIG. 10 is a graph of calculated temperature change $\Delta Tmc$ (magnetocaloric effect) versus temperature for the magnetic field changes set forth for the $(Gd_{0.54} Er_{0.46})AlNi$ alloy.
Figure 11A:
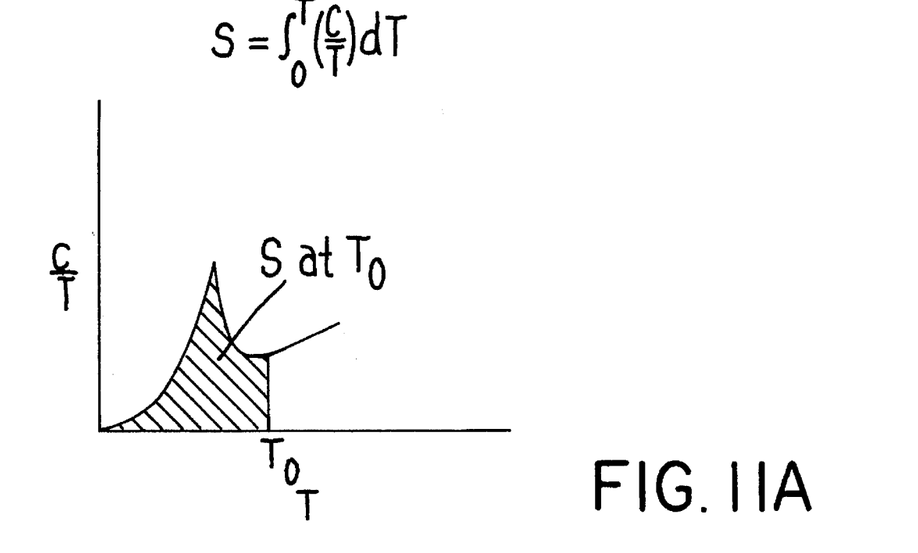
FIG. 11A is a graphic illustration of the integration of the C/T versus temperature curve to obtain entropy.
Figure 11B:
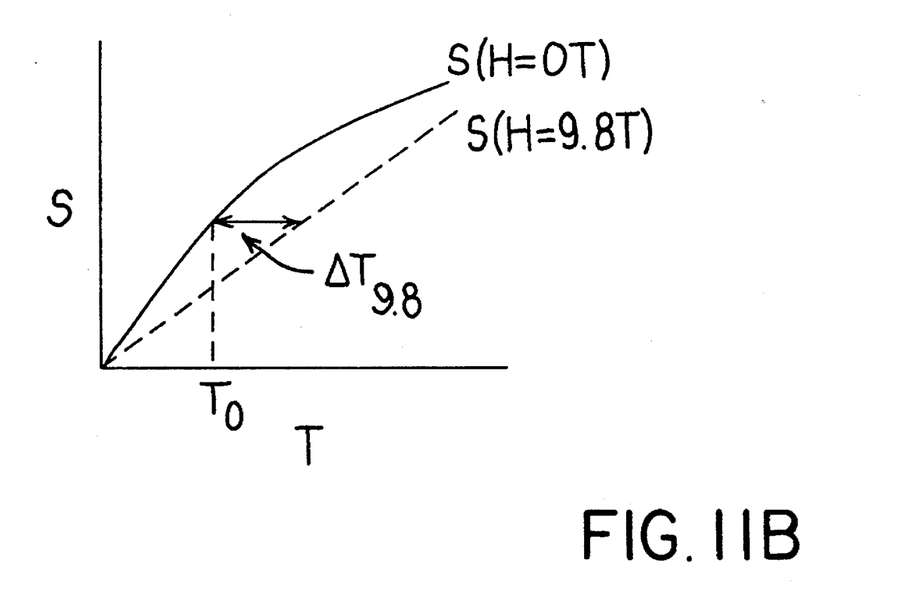
FIG. 11B is a graphic illustration of the determination of the determination of the adiabatic temperature change from the entropy versus temperature curve.

In general, FIGS. 4 and 7 are the heat capacity from approximately 1.5 to approximately 70 K. for five different magnetic fields (i.e. 0, 2.46, 5.32, 7.53, and 9.85 T-tesla). FIGS. 5 and 9 are entropy versus temperature (0 to approximately 70 K.) for the same fields. FIG. 8 is a plot of C/T versus T for further illustration. FIGS. 6 and 10 are calculated temperature increases due to changing the magnetic field, i.e. the magnetocaloric effect. The temperature change versus temperature curves were calculated from the heat capacity data by first integrating the C/T versus T curve (where C is heat capacity in millijoules/mole K and T is temperature in K) as illustrated in FIG. 11A. Then, the adiabatic temperature change was determined from the entropy versus temperature curve as illustrated in FIG. 11B to allow the temperature change versus temperature curve to be calculated as indicative of the magnetocaloric effect.

For the exemplary DyAlNi magnetic refrigerant heat treated at 925° followed by 1125° C., the heat capacity results reveal a sharp ferromagnetic ordering peak of the magnetocaloric effect at approximately 29 K. and a lambatype shaped curve that is typical of a ferromagnetic material. The ordering peak is quite small, and the estimated entropy associated with magnetic ordering is approximately 65% of the full theoretical magnetic entropy for Dy. This suggests that a considerable amount of the magnetic entropy is tied up in crystalline electric fields. Indeed, this is evident in the calculated magnetocaloric effect above the ordering peak wherein the curve does not fall-off or decrease.

Figure 12:
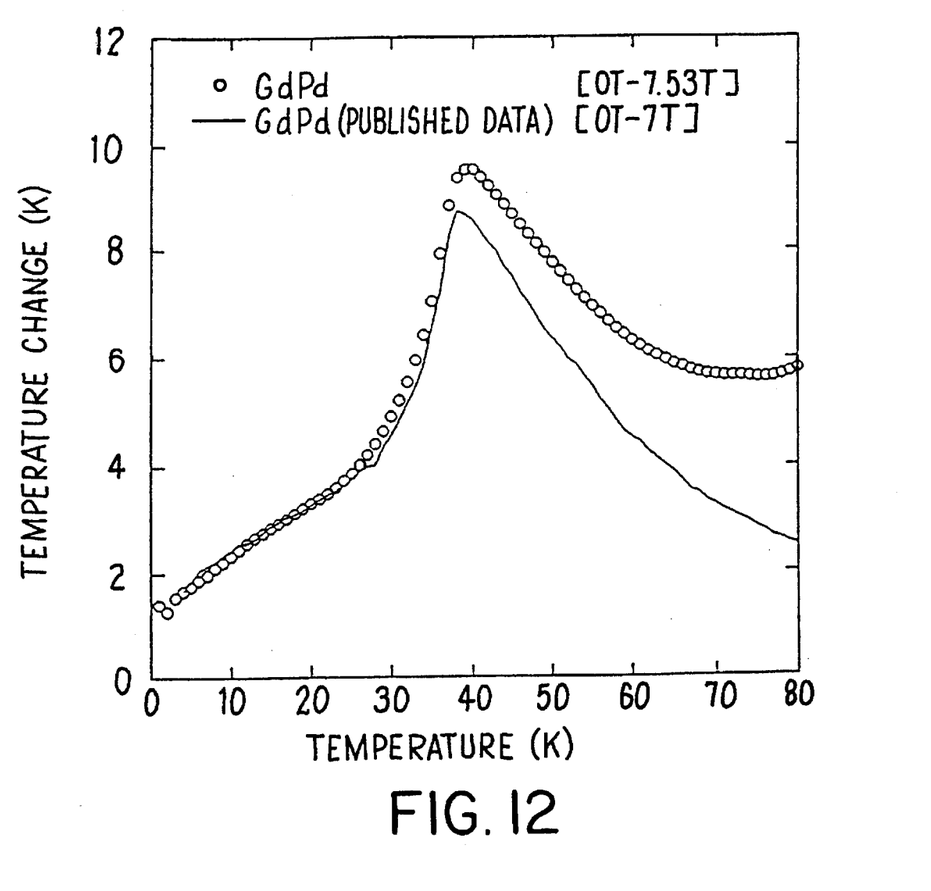
FIG. 12 is a graph of temperature change $\Delta Tmc$ versus temperature measured and reported in the literature (solid line) for a GdPd magnetic alloy for a magnetic field changes from 0 to 7 Tesla (T) and as calculated by Applicants from measured heat capacity data for a like alloy for magnetic field changes from 0 to 7.53 T.

The heat capacity data above 50 to 70 K. show considerable scatter and may tend to be too large. For example, referring to FIG. 12, the temperature change (magnetocaloric effect) versus temperature for a reference GdPd magnetic alloy is shown as calculated using the same techniques used to generate FIGS. 6 discussed hereabove and also FIG. 10 discussed herebelow. The temperature change versus temperature curve generated using this technique is compared to a similar measured (not calculated) curve for the same alloy as reported by Zimm et al. in the article entitled "MATERIALS FOR REGENERATIVE COOLING SPANNING 20 K. TO 80 K.", *Adv. Cryogenic Eng.* 37, (Part B), 883–890 (1992). The curves of FIG. 12 indicate that the temperature change versus temperature results used by Applicants were consistent with the direct measurement reported in the aforementioned literature.

The DyAlNi ternary refrigerant does not appear to exhibit a delta shaped $\Delta Tmc$ (temperature change) versus T curve. The low temperature side of the $\Delta Tmc$ versus T curve are linear enough but at high temperature $\Delta Tmc$ is essentially constant and may even increase. As a result of this unusual and novel shape of the $\Delta Tmc$ versus T curve, the DyAlNi ternary refrigerant appears to be useful as the sole refrigerant of single composition in an Ericsson cycle refrigerator wherein a relatively constant $\Delta Tmc$ over a wide temperature range is needed. The need for such a refrigerant is described in the aforementioned U.S. Pat. No. 4,829,770 and shown in FIGS. 5 and 6 thereof. Thus, use of the DyAlNi refrigerant of this invention as the sole refrigerant in the Ericsson cycle refrigerator eliminates the need for the complex three component refrigerant of the '770 patent.

For the exemplary $(Gd_{0.54} Er_{0.46})AlNi$ magnetic refrigerant, the heat capacity versus temperature curve of FIG. 7 indicates that this alloy orders at two temperatures, approximately 18 K. and 38 K. FIG. 8 makes this more evident. The total magnetic entropy associated with the magnetic orderings is approximately 86% of the full theoretical magnetic entropy for an alloy comprised of 54%Gd and 46%Er. This suggests that most of the magnetic entropy is tied up in the magnetic ordering process. The presence of two ordering temperatures is quite evident in the magnetocaloric curve of FIG. 10.

Figure 13:
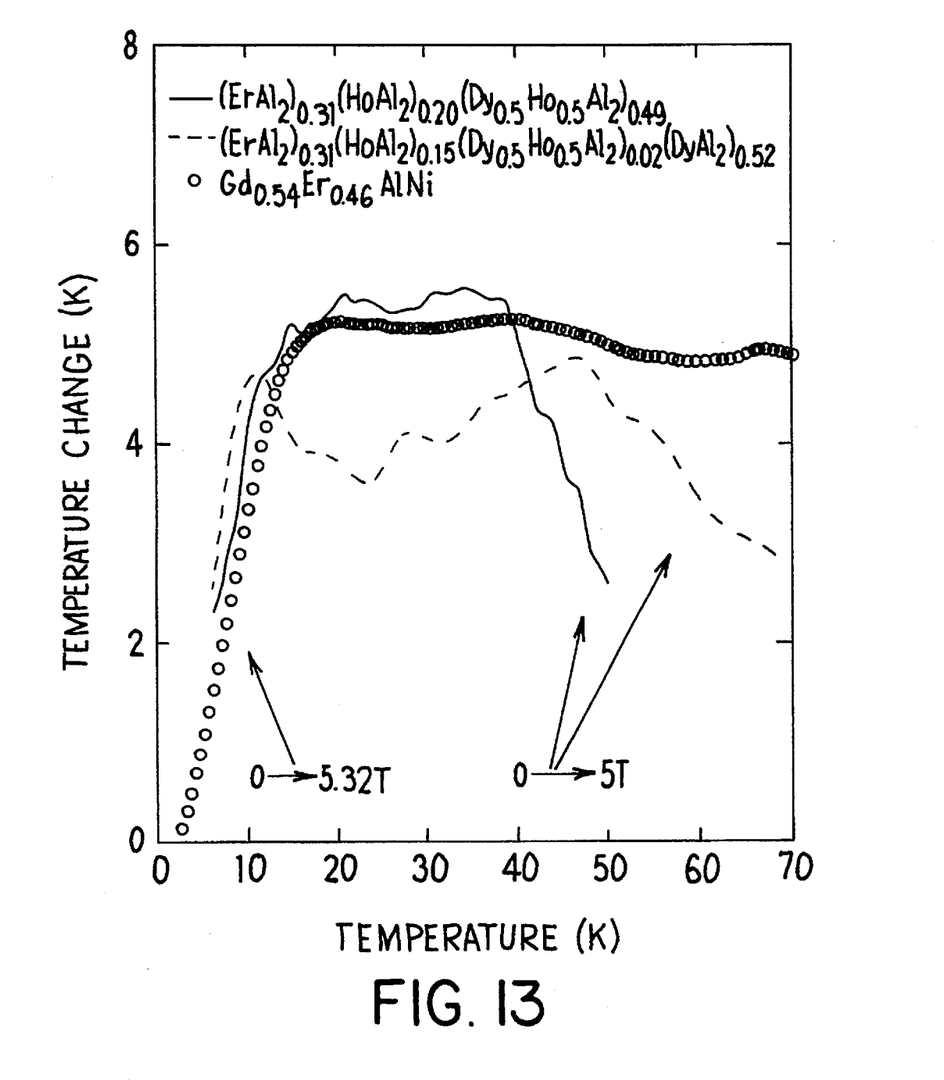
FIG. 13 is a graph of temperature change versus temperature for $(Gd_{0.54}Er_{0.46})AlNi$ for a field change range of 0 to 5.32T and for 3 phase and 4 phase mixtures of lanthanide aluminides for field change range of 0 to 5T.

A comparison in FIG. 13 of the calculated temperature change versus temperature plot for the $(Gd_{0.54}Er_{0.46})AlNi$ alloy refrigerant versus those for prior art three (3) phase and four (4) phase mixtures of lanthanide aluminides indicates that $(Gd_{0.54}Er_{0.46})AlNi$ is about as effective as the complex 3 and 4 phase mixtures of lanthanide aluminides as an Ericsson cycle refrigerant. The temperature change versus temperature plots for the respective 3 phase and 4 phase mixtures of lanthanide aluminide were calculated from FIG. 4 of the Hashimoto et al article entitled NEW APPLICATION OF COMPLEX MAGNETIC MATERIALS TO THE MAGNETIC REFRIGERANT IN AN ERICSSON MAGNETIC REFRIGERATOR, J. Appl. Phys. 62(9), Nov. 1, 1987, and FIG. 5 of the Hashimoto et al article INVESTIGATION OF THE MAGNETIC REFRIGERANT FOR THE ERICSSON MAGNETIC REFRIGERATOR, Japanese J. of Appl. Phys., Vol. 26, (1987).

Figure 14:
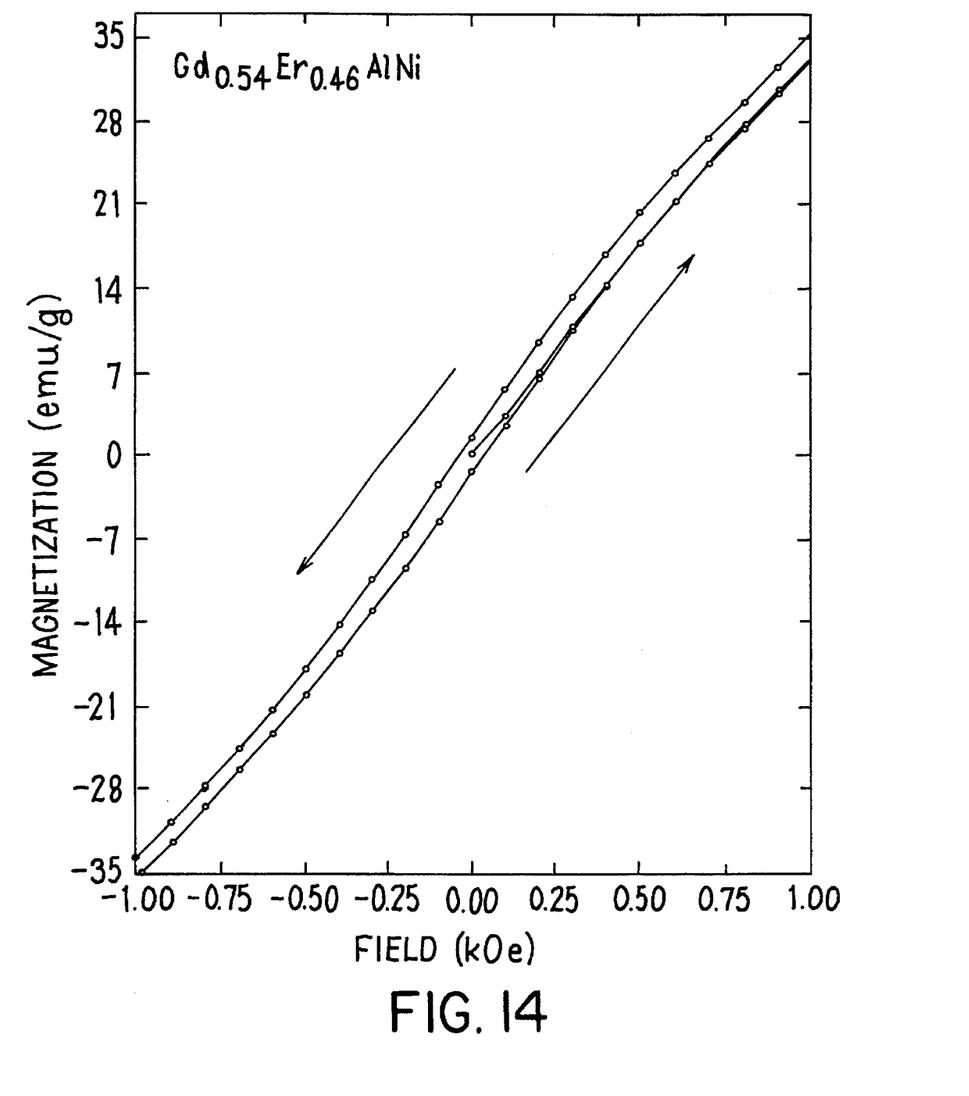
FIGS. 14–15 are graphs of magnetization versus applied field for $(Gd_{0.54}Er_{0.46})AlNi$ at 7.4 K.
Figure 15:
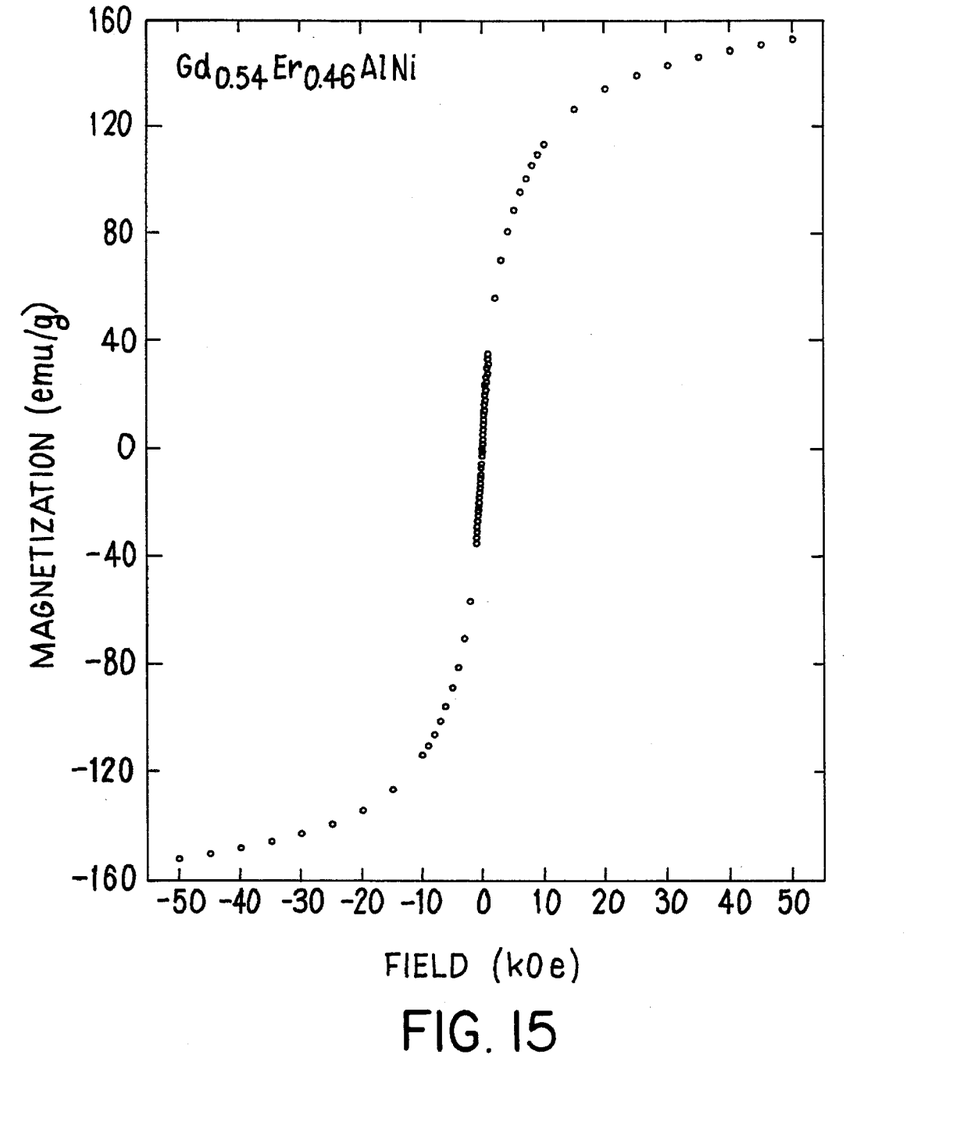

Referring to FIGS. 14–15, magnetization versus applied field graphs (for two different applied field ranges) for $(Gd_{0.54}Er_{0.46})AlNi$ at 7.4 K. are shown. FIG. 14 (applied field from −1.0 to +1.0 KOe) shows that the magnetic BH hysteresis loop is 35 Oe wide at 7.4 K., which is about seven times narrower than that of a $(Dy_{0.54}Er_{0.5})Al_2$ refrigerant tested at the same temperature. FIGS. 14–15 indicate that the $(Gd_{0.54}Er_{0.46})AlNi$ alloy has a narrow BH loop and thus should be useful as a magnetic refrigerant.

The series of alloys $(Gd_{1-x}Er_x)AlN$ where $0>X<1$ could be used as magnetic refrigerants with magnetic ordering temperatures ranging between about 61 K. (for pure GdAlNi) and about 16 K. (for pure ErANi), with the magnetic ordering temperatures of the refrigerant scaled between 61 K. and 16 K. using the deGennes factor described in P. G. deGennes, SURLES PROPERTIÉS DES MÉTANUX DES TERRES RARES, *Compt. rend.*, vol. 247, page 1836 (1958).

As observed for the DyAlNi ternary alloy, the quaternary refrigerant does not appear to exhibit a delta shaped $\Delta Tmc$ versus T curve. The low temperature side of the $\Delta Tmc$ versus T curve are linear enough but at high temperature $\Delta Tmc$ is essentially constant and may even increase. As a result of this unusual and novel shape of the $\Delta Tmc$ versus T curve, the $(Gd_{0.54} Er_{0.46})AlNi$ quaternary refrigerant appears to be useful as the sole refrigerant in a Ericsson cycle refrigerator wherein a relatively constant $\Delta Tmc$ over a wide temperature range is needed. As mentioned hereabove, the need for such a refrigerant is described in the aforementioned U.S. Pat. No. 4,829,770 such that use of the $(Gd_{0.54}Er_{0.46})AlNi$ refrigerant of this invention in the Ericsson cycle refrigerator would eliminate the need for the complex three component refrigerant of the '770 patent.

The novel shape of the $\Delta Tmc$ versus T curve for the ternary and quaternary refrigerants provides advantages for use in the Ericsson type refrigerator despite the relatively small $\Delta Tmc$ value at the ordering peak (magnetocaloric effect) as compared to the GdPd refrigerant shown for comparison.

It will be understood that the above description of the invention is susceptible to various modifications, changes, and adaptations, and the same are intended to be comprehended within the scope of the appended claims.

The embodiments of the invention in which an exclusive property or privilege is claimed are defined as follows:

1. An Ericsson cycle magnetic refrigerant for a magnetic refrigerator using the Ericsson thermodynamic cycle comprising RAlNi wherein R is selected from the group consisting of Gd, Tb, Dy, Ho, and Er and wherein said RAlNi is a substantially single phase having less than about 10 volume % second phase therein and a generally constant magnetocaloric effect above a magnetic ordering temperature.

2. An Ericsson cycle magnetic refrigerant for a magnetic refrigerator using the Ericsson thermodynamic cycle comprising DyAlNi wherein said DyAlNi is a substantially single phase having a magnetic ordering temperature of about 24 K. and a generally constant magnetocaloric effect above said magnetic ordering temperature.

3. An Ericsson cycle magnetic refrigerate for a magnetic refrigerator using the Ericsson thermodynamic cycle comprising $(R_{1-x}R'_x)$AlNi wherein R and R' are different lanthanide elements selected from the group consisting of Gd, Tb, Dy, Ho, and Er and where x is greater than 0 and less than 1 and wherein said $(R_{1-x}R'_x)$AlNi is a substantially single phase having less than about 10 volume % second phase therein and a generally constant magnetocaloric effect above a magnetic ordering temperature.

4. An Ericsson cycle magnetic refrigerant for a magnetic refrigerator using the Ericsson thermodynamic cycle comprising $(Gd_{0.54}Er_{0.46})$AlNi wherein said $(Gd_{0.54}Er_{0.46})$AlNi is a substantially single phase having a generally constant magnetocaloric effect above a magnetic ordering temperature.

5. An Ericsson cycle magnetic refrigerator having a single magnetic refrigerant for a temperature range of about 5 K. to about 80 K. consisting of RAlNi wherein R is selected from the group consisting of Gd, Tb, Dy, Ho, and Er and wherein said RAlNi is a substantially single phase having less than about 10 volume % second phase therein and a generally constant magnetocaloric effect above a magnetic ordering temperature.

6. An Ericsson cycle magnetic refrigerator having a single magnetic refrigerant for a temperature range of about 5 K. to about 80 K. consisting of DyAlNi and wherein said DyAlNi is a substantially single phase having a magnetic ordering temperature of about 29 K. and a generally constant magnetocaloric effect above said magnetic ordering temperature.

7. An Ericsson cycle magnetic refrigerator having a single magnetic refrigerant for a temperature range of about 5 K. to about 80 K. consisting of $(R_{1-x}R'_x)$AlNi wherein R and R' are different lanthanide elements selected from the group consisting of Gd, Tb, Dy, Ho, and Er and where x is greater than 0 and less than 1 and wherein said $(R_{1-x}R'_x)$AlNi is a substantially single phase having less than about 10 volume % second phase therein and a generally constant magnetocaloric effect above a magnetic ordering temperature.

8. An Ericsson cycle magnetic refrigerator having a single magnetic refrigerant for a temperature range of about 5 K. to about 80 K. consisting of $(Gd_{0.54}Er_{0.46})$AlNi and wherein said $(Gd_{0.54}Er_{0.46})$AlNi is a substantially single phase having a generally constant magnetocaloric effect above a magnetic ordering temperature.

9. A magnetic refrigeration process using an Ericsson cycle and a single magnetic refrigerant for a temperature range of about 5 K. to about 80 K. consisting of RAlNi wherein R is selected from the group consisting of Gd, Tb, Dy, Ho, and Er and wherein said RAlNi is substantially a single phase having a generally constant magnetocaloric effect above a magnetic ordering temperature.

10. A magnetic refrigeration process using an Ericsson cycle and a single magnetic refrigerant for a temperature range of about 5 K. to about 80 K. consisting of DyAlNi and wherein said DyAlNi is a substantially single phase having a generally constant magnetocaloric effect above a magnetic ordering temperature.

11. A magnetic refrigeration process using an Ericsson cycle and a single magnetic refrigerant for a temperature range of about 5 K. to about 80 K. consisting of $(R_{1-x}R'_x)$AlNi wherein R and R' are different lanthanide elements selected from the group consisting of Gd, Tb, Dy, Ho, and Er and where x is greater than 0 and less than 1 and wherein said $(R_{1-x}R'_x)$ AlNi is a substantially Single phase having a generally constant magnetocaloric effect above a magnetic ordering temperature.

12. A magnetic refrigerant particulates bed for a magnetic refrigerator using the Ericsson cycle comprising particulates having a single composition of claim 1 or 3.

13. A magnetic refrigeration process using an Ericsson cycle and a single magnetic refrigerant for a temperature range of about 5 K. to about 80 K. consisting of $(Gd_{0.54}Er_{0.46})$AlNi having a substantially single phase exhibiting a generally constant magnetocaloric effect above a magnetic ordering temperature.

\* \* \* \* \*